United States Patent Office 3,215,730
Patented Nov. 2, 1965

3,215,730
PROCESS FOR THE MANUFACTURE OF OXIMINO-KETONES
Heinz Späthe and Helmut Gossel, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 23, 1961, Ser. No. 147,054
Claims priority, application Germany, Nov. 10, 1960, F 32,508
5 Claims. (Cl. 260—482)

The present invention relates to a process for the manufacture of oximino-ketones.

Ketones, diketones and $\beta$-ketocarboxylic acid esters react with esters or salts of nitrous acid to form the corresponding oximino-ketones (isonitroso-ketones). In this known reaction, esters of nitrous acid and aliphatic alcohols, for example, are allowed to react in an acid solution with the corresponding carbonyl compounds. Similar results are obtained by reacting sodium nitrite in glacial acetic acid with carbonyl compound. Mixtures of pure nitrogen monoxide and air can also be used in combination with hydrochloric acid as catalyst for preparing oximino-ketones. In this latter case, care must be taken to avoid the formation of nitrogen dioxide from the nitrogen monoxide and air before their reacting with the carbonyl compound.

The present invention provides an economical process for preparing oximino-carbonyl compounds in good yields, wherein industrial nitrous gases containing bound oxygen at least in the proportion corresponding to the formula $N_2O_3$ are reacted, if desired with the addition of molecular oxygen in free or dilute form, at temperatures within the range of 0 to 80° C., preferably 15 to 40° C., with aliphatic, cycloaliphatic, aliphatic-aromatic ketones, $\beta$-diketones and/or $\beta$-ketocarboxylic acid esters which may contain halogen, e.g. chlorine atoms, or alkyl groups as substituents and carry at least two hydrogen atoms attached to at least one of the carbon atoms adjacent to the carbonyl group, i.e. carry the —$CH_2$—CO— grouping, the reaction being carried out while adding acid catalysts and, if desired, inert diluting agents.

Contrary to all expectation, it has been found that the above reaction using gases which contain considerable nitrogen dioxide produces sufficiently pure oximino-ketones. The process of this invention offers the special advantage that the rather difficult isolation of pure nitrogen monoxide can be omitted, respectively that no costly esters and salts of nitrous acid must be used. The process of this invention uses as agents introducing the nitroso group into the carbonyl compounds the gas mixture evolved during the manufacture of nitrous gases, for example by combustion of ammonia, provided that the gas mixture includes the minimum proportion of nitrogen dioxide indicated above. This gas mixture contains nitrogen monoxide, nitrogen dioxide, oxygen, nitrogen and steam. Separation of any of the components gaseous at room temperature otherwise necessary, for example, in the preparation of esters or salts of nitrous acid or pure nitrogen monoxide, is not necessary. The mixture of nitrous gases must only be cooled to the temperature required for carrying out the present reaction. The mixture of nitrous gases is advantageously admixed with a further amount of air before the mixture is introduced into the carbonyl compound or the air may be introduced separately from the mixture into the carbonyl compound. Instead of with air, the nitrous gas mixture may also be admixed with pure oxygen or air enriched with oxygen.

As organic reaction components there may be used saturated and olefinically unsaturated aliphatic ketones and aliphatic halogeno-ketones having up to 20 carbon atoms, such as acetone, monochloroacetone, monobromoacetone, methylethylketone, diethylketone, dipropylketone, methylallylketone, ethylisopropylketone, ethylisobutylketone, ethylisoamylketone, ethylisohexylketone or ethylheptadecylketone. There may also be used cycloaliphatic ketones, preferably those in which 5 to 7 carbon atoms form a saturated isocyclic ring, for example cyclopentanone, methylcyclopentanone, cyclohexanone, methylcyclohexanones or ethylcyclohexanones, cycloheptanone and ketones derived from polynuclear, isocyclic rings, e.g. tetralone and camphor. As suitable mixed aliphatic-aromatic ketones, there may be mentioned more especially, for example: acetophenone, propiophenone or methylbenzylketone. The saturated $\beta$-diketones used in this invention include, for example acetylacetone and benzoylacetone, and the saturated $\beta$-ketocarboxylic acid esters include acetoacetic acid esters, e.g. the acetoacetic acid ethylester.

The catalysts used in this invention are compounds which are known to constitute condensing agents and/or are capable of forming nitrosyl compounds, for example sulfuric acid, hydrochloric acid, phosphoric acid, aluminum chloride, zinc chloride and acid ion exchangers. The diluents used include inert liquids, such as aliphatic ethers, hydrocarbons, halohydrocarbons and nitrohydrocarbons, among which benzene, toluene, xylene, carbon tetrachloride, chloroform and nitrobenzene are preferred. There may also be used other substances, such as fluorinated or chlorinated methanes and/or ethanes, chlorobenzene, dichlorobenzene, bromobenzene or fractions of natural or synthetic hydrocarbons having a boiling point of up to 300° C.

The reaction can be carried out at temperatures within the range of 0 and 80° C., advantageously 15 and 40° C., at reduced, atmospheric or raised pressure. The reaction heat evolved is dissipated by indirectly cooling the reaction mixture or evaporating the diluent boiling at a temperature lower than the reaction mixture. The reaction mixture should be kept in vivid motion, for example by stirring or repumping the liquid phase.

The nitrous gases are advantageously supplied at a rate such that the issuing gas only contains traces of nitrogen oxides. The reaction may be interrupted when part of the carbonyl compound has undergone reaction, and unchanged carbonyl compound removed from the reaction product by distillation may be used again in the reaction. In order to produce an especially pure oximino compound, it is advantageous to interrupt the reaction when about 10–50% of carbonyl compound has reacted.

The acid-reacting reaction mixture, if desired after neutralization with cooling, is first freed from solid constituents using alkaline agents, for example alkali metal or alkaline earth metal carbonates or hydroxides or alkaline earth metal oxides, and then by distillation from excess carbonyl compound and, if necessary, diluent. The oximinoketone is then obtained as residue. The use of an appropriate diluent, especially in the preparation of cyclic compounds, involves crystallization of the oximinoketone already during the reaction. The crystalline magma can be separated from the reaction mixture by suction-filtration.

The following examples serve to illustrate the invention, but they are not intended to limit it thereto:

*Example 1*

A 1-liter four-necked flask provided with stirrer, reflux condenser and two gas inlet frits was charged with 5 g. anhydrous aluminum chloride as catalyst suspended in 3 mols (174.2 g.) hydrous acetone. A nitrogen oxide-containing gas, dried and cooled to room temperature was introduced for 4 hours while stirring well into this suspension. The gas which contained $NO_2$ and NO in the ratio of about 1:1 and had been obtained by ammonia combustion was introduced at the rate of 35 l./h. The temperature in the reaction mixture was maintained at 15 to 30° C. by water cooling. The reaction mixture which turned green during the reaction was freed from the catalyst, neutralized with sodium carbonate and unreacted acetone was distilled off under reduced pressure. 49 g. oximinoacetone were obtained. The substance melted at 65° C. The apparatus and the nitrogen oxide-containing gas were also used in the following examples and the reaction mixtures worked up in the manner described above unless otherwise stated.

Example 2

The apparatus was charged with 465 g. dry acetone and 5 g. anhydrous aluminum chloride. 60 l. of the gas containing nitrogen oxides and simultaneously 90 l. of air were then introduced into the clear solution within 3 hours at 15 to 30° C. The reaction mixture was neutralized and excess acetone was distilled off. 29 g. oximinoacetone melting at 65° C. were obtained.

Example 3

172 l. gas containing nitrogen oxides and 200 l. air were introduced within 4 hours into a suspension of 5 g. aluminum chloride in 230 g. dry methylethylketone. The suspension was not cooled and the temperature rose to 50° C. during the reaction. The catalyst was filtered off, the reaction mixture was neutralized and excess ketone was distilled off. 55 g. very pure oximinomethylethylketone were isolated. The substance melted at 76° C.

When the aluminum chloride was replaced by phosphorus pentoxide while the other conditions remained the same and 160 l. of gas containing nitrogen oxide were introduced without air being added, there were obtained 47 g. oximinomethylethylketone.

Example 4

6 cc. 95% phosphoric acid ($H_3PO_4$) were dissolved in 230 g. methylethylketone and 140 l. gas containing nitrogen oxides and 140 l. air were introduced simultaneously within 4 hours into the solution which was maintained at a temperature of 10° C. by cooling with ice. The reaction mixture was neutralized and worked up. 52 g. oximinomethylethylketone were obtained.

When under otherwise identical conditions the phosphoric acid was replaced by 5 cc. semi-concentrated sulfuric acid there were obtained 55 g. oximinomethylethylketone.

Example 5

5 g. phosphoric acid were dissolved in 200 g. diethylketone and 168 l. gas containing nitrogen oxides were introduced into the solution within 4 hours without air being added. The temperature was maintained at 20° C. by water-cooling. The reaction mixture was worked up and 72 g. oximinodiethylketone melting at 62° C. were isolated.

Example 6

5 cc. phosphoric acid were dissolved in 200 g. methyl-n-propylketone and 140 l. gas containing nitrogen oxides together with 160 l. air were introduced into the solution within 4 hours. The temperature was maintained at 20° C. by water-cooling. The reaction mixture was worked up to yield 37 g. oximinomethyl-n-propylketone. The substance melted at 54° C.

Example 7

5 g. anhydrous aluminum chloride were suspended in 500 g. dry acetylacetone and 140 l. gas containing nitrogen oxides were introduced into the suspension within 4 hours. The suspension was maintained at 30° C. without air being introduced. After the reaction, the catalyst was filtered off, the reaction mixture was neutralized with sodium carbonate and the filtrate was cooled. Oximinoacetylacetone was obtained in the form of long needles. The product which melted at 73° C. was obtained in a yield of 7 g.

Example 8

5 g. anhydrous aluminum chloride were dissolved in 240 g. dry acetophenone and 115 l. gas containing nitrogen-oxides together with 60 l. air were introduced into the solution within 3 hours. During the reaction, the temperature rose to 46° C. The reaction mixture was extracted with a 20% potassium hydroxide solution and the alkaline extract was acidified with hydrochloric acid. After a short while, oximinoacetophenone was obtained in the form of long needles. The product which melted at 120° C. was obtained with a yield of 35 g.

Example 9

200 g. dry cyclohexanone were dissolved in 350 g. anhydrous carbon tetrachloride and 5 g. anhydrous aluminum chloride were suspended in the solution. About 175 l. gas containing nitrogen oxides were then introduced within 5 hours without air being added. The temperature of the suspension was maintained at 20° C. by water-cooling. 1.3-dioximinocyclohexanone precipitated during the reaction. The oximino compound was filtered off and the catalyst was removed by washing with dry acetone. 47 g. dioximinocyclohexanone were obtained.

Example 10

8.8 l. nitrous gases were introduced into a suspension of 5 g. anhydrous aluminum chloride in 250 g. dry acetoacetic acid ester. The mixture was freed from the catalyst by filtration and neutralized over a strongly basic styrene resin ion exchanger. The resulting solution was concentrated under reduced pressure and cooled. After a short time, the oximino-acetoacetic acid ester was obtained in crystallized form. The compound melted at 54° C.

We claim:

1. A process for the manufacture of oximino-carbonyl compounds which comprises reacting a ketone selected from the group consisting of monoketones of saturated and olefinically unsaturated aliphatic hydrocarbons, said monoketones having up to 20 carbon atoms, ketones of cycloaliphatic hydrocarbons, the cycloaliphatic groups of which have 5 to 7 carbon atoms forming a saturated isocyclic ring, ketones of alkylaryl compounds, said ketones having up to 9 carbon atoms, β-diketones of saturated aliphatic hydrocarbons, said diketones having 5 to 10 carbon atoms, saturated β-keto-carboxylic acid esters having up to 6 carbon atoms, and chlorine-substituted and bromine-substituted products of these compounds, all said ketones, diketones, and substituted products having a methylene group adjacent a keto-carbonyl group therein, with a nitrous gas containing bound oxygen and nitrogen at least in a proportion corresponding with the formula $N_2O_3$, at a temperature of from 0° C. to 80° C. in the presence of an acid catalyst selected from the group consisting of sulfuric acid, hydrochloric acid, phosphoric acid, aluminum chloride, zinc chloride, and acid ion exchangers, and then recovering said oximino-carbonyl compound.

2. The process of claim 1, wherein in addition to the nitrous gas a second gas containing molecular oxygen is introduced into the reaction mixture.

3. The process of claim 1, wherein the gas mixture containing the nitrous gases also contains molecular oxygen.

4. The process of claim 1, wherein the carbonyl compound and the acid catalyst are admixed with an inert diluent.

5. The process of claim 1, wherein the reaction is carried out at a temperature within the range of 15 and 40° C.

(Other references on following page)

References Cited by the Examiner

UNITED STATES PATENTS 2,749,358 6/56 Reilly _____ 260—566
2,844,630 7/58 Johnson et al.

OTHER REFERENCES

Adams et al.: "Organic Reactions," vol. VII, page 330 (1953).

Adams et al.: "Organic Reactions," vol. VII, pp. 327–377 (1953).

Remy: "Treatise on Inorganic Chemistry," vol. 1, page 593 (1956).

Wieland et al.: Ber Deut. Chem., vol. 37, pages 1524–1526 (1904).

CHARLES B. PARKER, *Primary Examiner.*

LEON ZITVER, *Examiner.*